US011897743B2

(12) United States Patent
Carter et al.

(10) Patent No.: US 11,897,743 B2
(45) Date of Patent: Feb. 13, 2024

(54) WINE OPENER WITH INTERIOR THREADS

(71) Applicants: Christopher Kirk Carter, Longmont, CO (US); Nicholas Robert Pierce, Evergreen, CO (US)

(72) Inventors: Christopher Kirk Carter, Longmont, CO (US); Nicholas Robert Pierce, Evergreen, CO (US)

( * ) Notice: Subject to any disclaimer, the term of this patent is extended or adjusted under 35 U.S.C. 154(b) by 245 days.

(21) Appl. No.: 17/459,061

(22) Filed: Aug. 27, 2021

(65) Prior Publication Data

US 2021/0387839 A1 Dec. 16, 2021

Related U.S. Application Data

(63) Continuation-in-part of application No. 16/814,876, filed on Mar. 10, 2020, now Pat. No. 11,130,666.

(51) Int. Cl.
*B67B 7/06* (2006.01)

(52) U.S. Cl.
CPC .................................... *B67B 7/063* (2013.01)

(58) Field of Classification Search
CPC ..... B67B 7/0447; B67B 7/0435; B67B 7/063; B67B 7/06; B67B 2007/0494; B67B 7/04
USPC ................................. 81/3.45, 3.47, 3.48, 3.4
See application file for complete search history.

(56) References Cited

U.S. PATENT DOCUMENTS 5,010,790 A * 4/1991 Yen ........................... B67B 7/02 81/3.35

FOREIGN PATENT DOCUMENTS

WO WO-0056614 A1 * 9/2000 ............. B65D 39/16

* cited by examiner

*Primary Examiner* — Tom Rodgers

(57) ABSTRACT

The industry-standard corkscrew has numerous flaws resulting in broken corks—even in the hands of a professional. The present invention is a radical departure from the traditional corkscrew apparatus. The opener generally consists of the handle and an internally threaded half-pipe. The half-pipe slides between the cork and the bottle, wherein the series of threads engage the cork. Rotating the handle causes the threads to bore deeper into the neck of the bottle until the handles meets the lip of the bottle, and then lift the cork out of the bottle until it disengages and falls away from the opener. It should be appreciated that the elegance of the opener resides in its simplicity.

10 Claims, 10 Drawing Sheets

WINE OPENER WITH INTERIOR THREADS

CROSS-REFERENCE TO RELATED APPLICATION

This application claims the benefit of U.S. Non-Provisional application Ser. No. 16/814,876, filed Mar. 10, 2020, and U.S. Provisional Application No. 62/816,742, filed Mar. 11, 2019.

BACKGROUND

The popularity of wine shows no sign of slowing down. U.S. wine sales for 2018 were in excess of $70 billion and that number has increased year over year for the past 25 years. Worldwide it is estimated that 31.4 billion bottles of wine are bought and sold each year.

Despite the many advances in the wine production industry, the method of using a cork stopper to seal a bottle has remained relatively unchanged for thousands of years. Some wine producers have transitioned from wooden corks to synthetic corks, but the general premise of placing a compressed cylinder deep into the neck of a bottle has stayed the same. It, therefore, follows that prior to consumption the end consumer faces the challenge of removing the cork.

Built off the traditional corkscrew, the industry standard wine opener, commonly known as the waiter's friend, is used by winemakers, sommeliers, waiters, and the consumers. The waiter's friend is relatively compact compared to other products in the market, but it has several major flaws. The waiter's friend requires that a corkscrew is first driven into the cork to a proper depth such that a notched lever can rest on the lip of the bottle to aid in pulling the cork. It is an awkward and intimidating tool for the uninitiated and even wine professionals routinely break corks in the bottle while using it. Mechanically, it relies on moving parts to create a leverage point on the lip of the bottle resulting in uneven and non-perpendicular forces pulling up on the cork. Lastly, once the cork is removed from the bottle, it remains on the end of the corkscrew and must be removed for the consumer to inspect and before the tool can open the next bottle.

The invention disclosed herein presents an improved alternative to the traditional corkscrew or waiter's friend to address the challenge of removing a cork.

SUMMARY OF THE INVENTION

The present invention, herein simply referred to as the opener, is a radical departure from the traditional corkscrew apparatus used to remove a cork from a bottle. The opener generally consists of two parts, a handle and an internally threaded half-pipe. In the preferred embodiment, the half-pipe is perpendicular to the handle, has an arc angle of roughly 180 degrees, and a diameter equivalent to the mouth of the corked bottle. The half-pipe slides between the cork and the inner wall of the bottle, wherein the series of internal threads engage the cork. By twisting the handle, the interaction between the internal threads and the exterior cork surface cause the half-pipe of the opener to bore deeper into the neck of the bottle.

The half-pipe will continue to drive into the bottle to a depth until the lip of the bottle reaches the handle. When the handle reaches the lip of the bottle, the internal threads will then begin to lift the cork out of the bottle. By continuing to twist the handle, the cork will rise until it disengages from the bottle and falls away from the opener.

It should be appreciated that the elegance of the opener resides in its simplicity, however, also disclosed are alternative enhancements and variations of the tool.

DETAILED DESCRIPTION OF THE INVENTION

The present invention, herein simply referred to as the opener 100, is a radical departure from the traditional corkscrew apparatus to remove a cork from a bottle. Disclosed are both the preferred embodiments of the apparatus, as well as the method of use by example. It should be appreciated that the elegance of the opener resides in its simplicity, however, also disclosed are alternative embodiments, enhancements, and variations of the tool.

Figure 1:
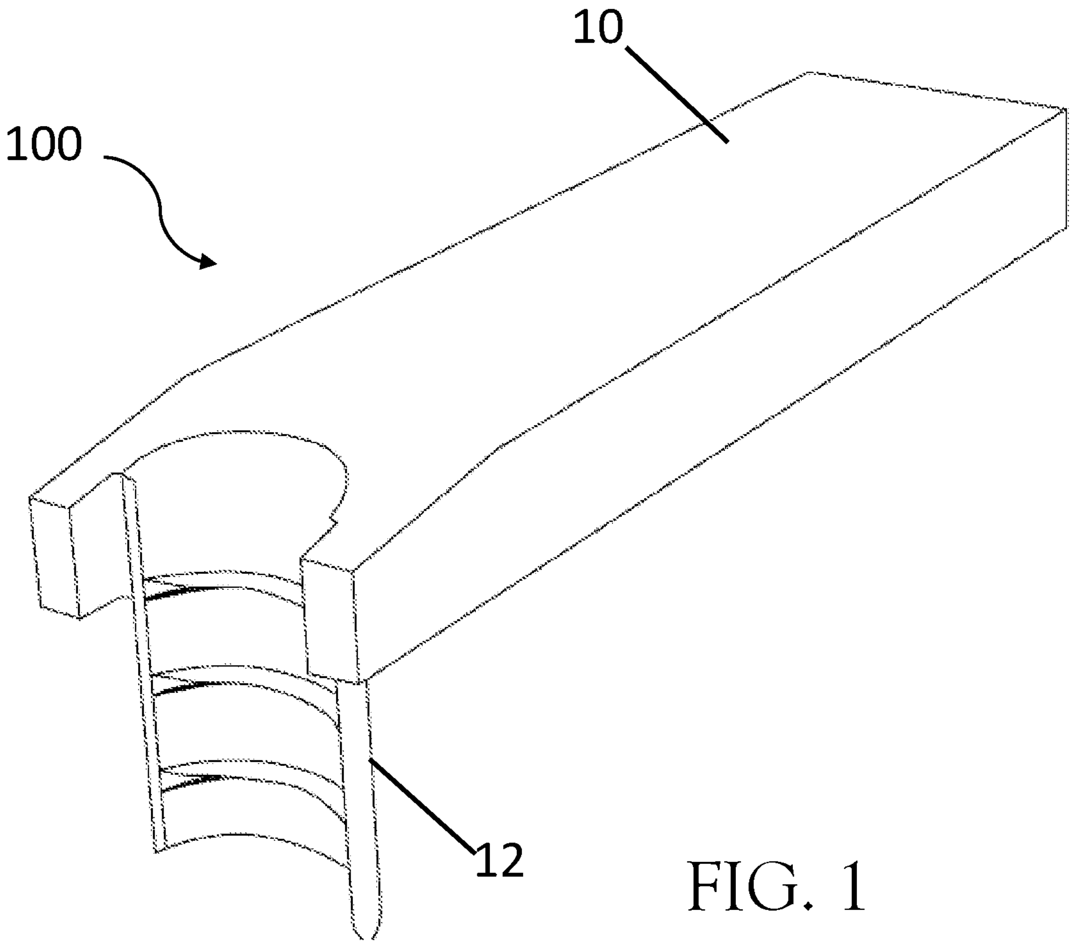
FIG. 1 shows an upper isometric view of the wine opener.

As shown in FIG. 1, the opener generally consists of two parts, a handle 10, and a spoon 12 which is positioned at the distal end of the handle. In the most basic form, the handle 10 provides a simple lever by which to rotate the spoon around a cylindrical axis extending from the center of the cork 24. As an alternative embodiment, the spoon may be positioned at an intermediate section of the handle. The spoon 12 generally comprises an internally threaded half-pipe or semi-cylindrical pipe with an arc angle 18 of roughly 180 degrees, and a diameter equivalent to the opening of the intended corked bottle. A standard 750 ml bottle of wine, as an example, has a finished opening at top of the bottle of 0.75 inches or 18.5 mm. In the preferred embodiment, the handle 10 is perpendicular to the longitudinal axis or central axis of the half-pipe.

Figure 2:
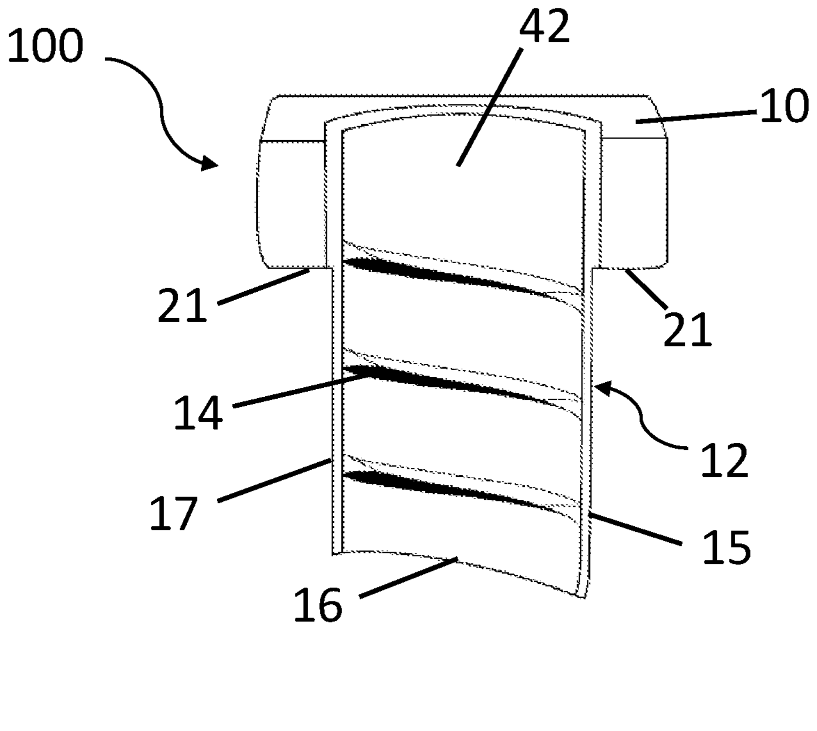
FIG. 2 shows a front view of the wine opener.

FIG. 2 is a front view of the opener 100. A shoulder 21 is formed around the edge of the spoon 12 where it coincides with the bottom of the handle 10. The spoon 12 has an inner wall 42 defined by an inner diameter, an outer wall 43 defined by an outer diameter, a wall thickness defined as the space between the surface of the inner wall 42 and outer wall 43, a plurality of internal threads 14, a leading edge 15, trailing edge 17, and a wedging edge 16. The throat length of the spoon 16 is defined as the distance from the wedging edge 16 to the shoulder 21.

The inner wall 42 is the surface of the spoon 12 configured to come into contact with the cylindrical surface of the cork 24. The outer wall 43 is the surface of the spoon 12 configured to come into contact with the inner surface of the bottle neck 28. In the preferred embodiment, the wall thickness is minimized such that the spoon may easily wedge between the bottle 22 and the cork 24. To aid in this initial process, the wedging edge 16 may be tapered relative to the general wall thickness of the spoon 12 allowing this wedging edge 16 to be introduced between the bottle 22 and cork 24 prior to the thread 15 engagement. In a similar manner, the leading edge 15 and/or the trailing edge 17, may also be tapered relative to the general wall thickness. In addition, the wedging edge 16 may employ various geometries such as the downward edge shown in FIG. 2, where the leading edge 15 is longer than the trailing edge 17, an upward-angle edge, where the leading edge 15 is shorter than the trailing edge 17, or a rounded edge that generally bows towards the middle of the spoon 12.

Figure 3A:
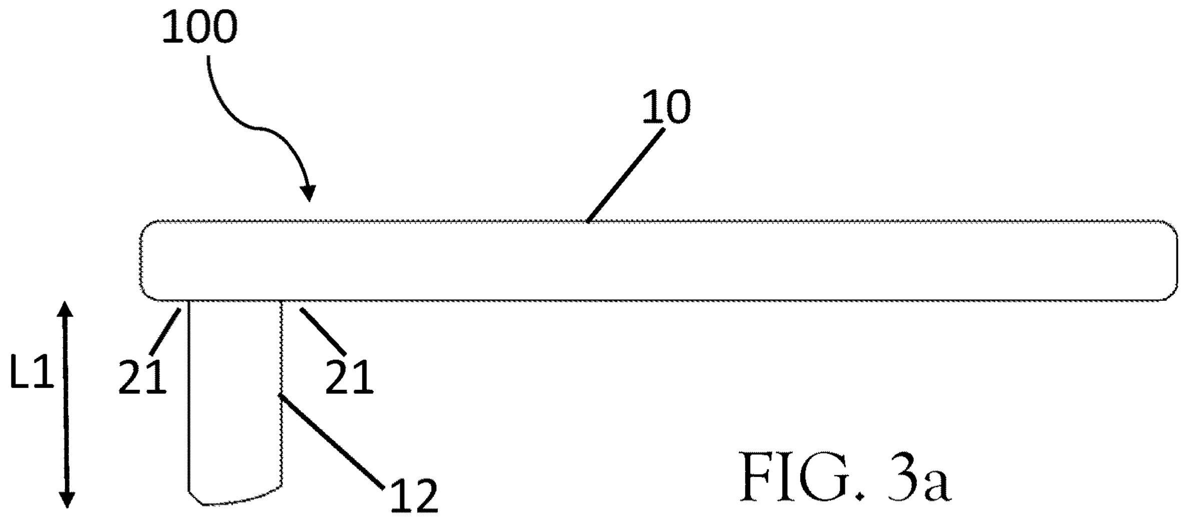
FIGS. 3*a* and 3*b* show a side view of the wine opener with various geometries.
Figure 3B:
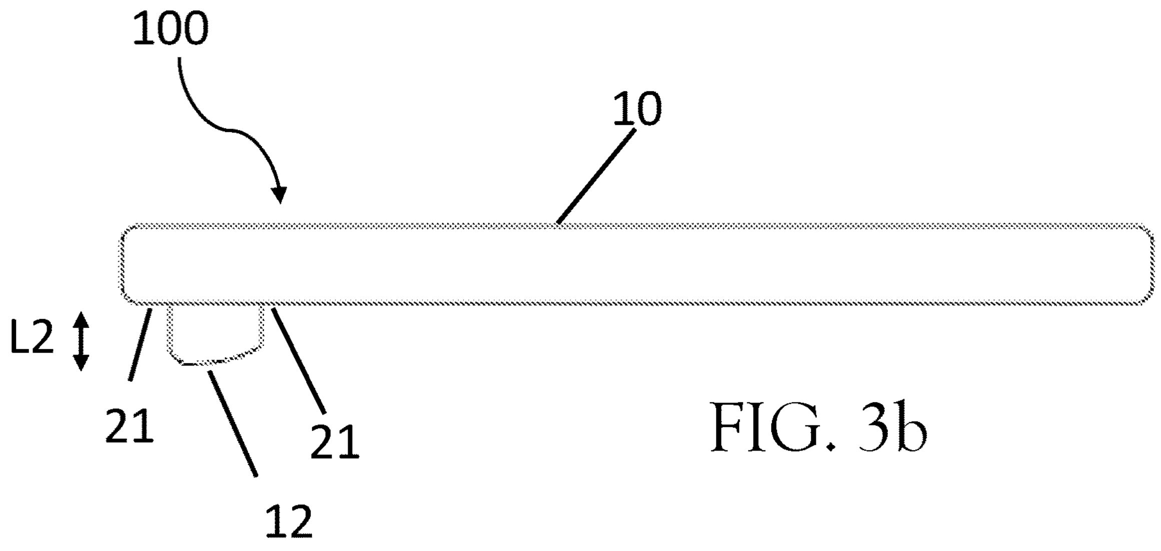

As shown in FIGS. 3*a* and 3*b*, the throat length is shown as Ll and L2 and may vary as well as the corresponding number of threads 14. The throat length functionally defines the depth to which the spoon will drive around the cork prior pulling the cork out of the bottle.

Figure 4:
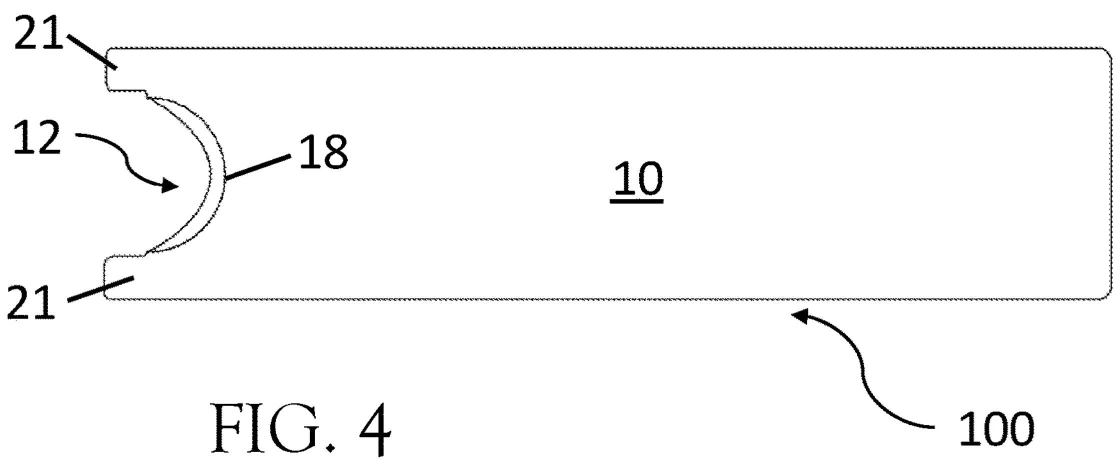
FIG. 4 shows a bottom view of the wine opener.

As shown in FIG. 4, the spoon 12 is preferably inset some distance from the distal end of the handle 10. Here, the handle 10 extends beyond the leading and trailing edge 15 and 17 of the spoon 12 to provide an extension of the shoulder 21 on each side of the spoon 12. The shoulder provides extra surface area to rest against the bottle lip 26.

The arc angle 18 of the spoon 12 is shown in FIG. 4 and defines the cross-sectional geometry of the inner wall 42 and thus the open face section of the spoon 12 opposite the inner wall 42. In the preferred embodiment, it is desirable for the cork 24 to fall away from the opener 100 after extraction. To accomplish this, the arc angle 18 of the spoon is defined as being between 65 degrees and 190 degrees. In an alternative embodiment, the arc angle may exceed 190 degrees to hold the cork 24 within the spoon 12 after extraction.

Figure 5A:
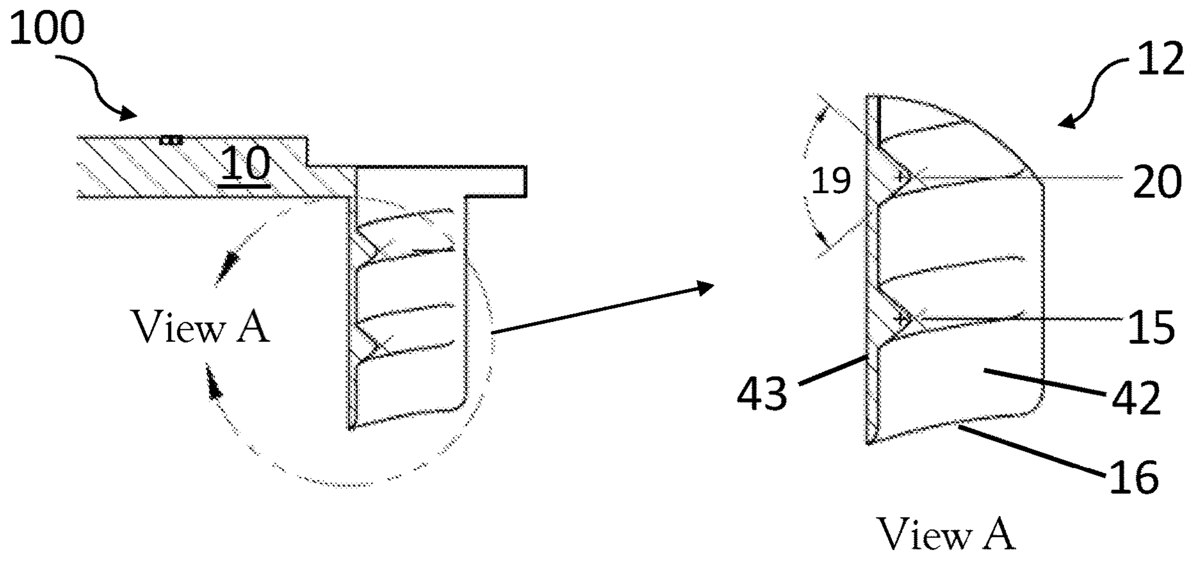
FIGS. 5*a* and 5*b* shows a detailed view of variations of the threaded member.
Figure 5B:
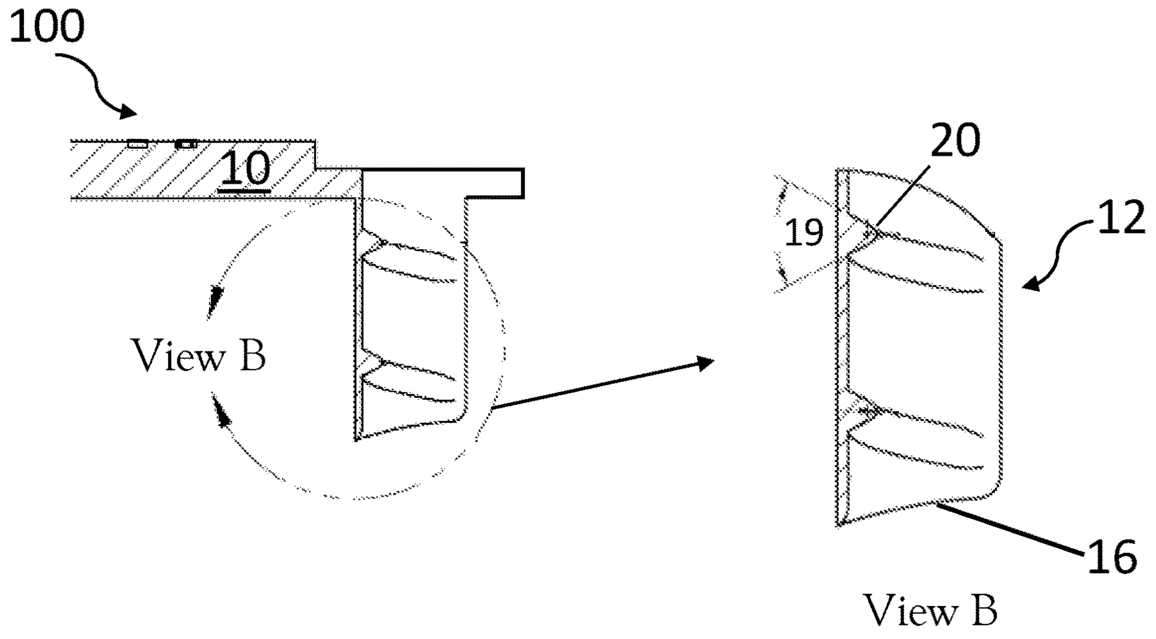

FIGS. 5*a* and 5*b* show detailed cross-sectional views of the spoon with slight variations including thread pitch, geometry, height, and orientation. These variations present a multitude of methods for optimization of the opener and that the thread may depend upon the cork material, user preference, or other perimeters.

Along the face of the inner wall 42 on both views 5*a* and 5*b* are a series of open threads 14 positioned at an angle offset from the horizontal axis defined by the bottom of the handle 10. In the preferred embodiment, the threads 14 are parallel to one another, however, they need not have identical depth or pitch. To illustrate possible variations, View A and View B show variations of thread angle 19 where View A has a thread angle 19 of 80° and View B has a thread angle 19 of 55° . Another variation in View A and B are differences in the thread crest 20 where View A comes to a sharp point and View B comprises a rounded or beveled shape. The idea behind the sharp point thread is to purposefully cut into the cork with a sharp thread. The beveled shape of the thread must be a small enough angle that the thread cleanly cuts into the cork without tearing. The benefit of a thread that cuts into the cork is that additional compression of the cork won't occur, and thread engagement can be ensured. The rounded edge on the threads is essential in compressing the cork without damage and this thread works by allowing the non-rigid material of the cork to form around the thread.

As a further extension of the optimization concepts presented, it may be beneficial to have shallow lower threads to initiate the engagement of the cork, and deeper threads higher on the inner wall 42 to aid in pulling the cork. Threads are most effective near the lip of the bottle, primarily due to the neck angle and the compression of the cork. The spoon 12 must compress the cork 24 into its shape to properly engage the threads; however, in the lower regions of the neck, the cork has additional room on the sides to expand, and although funneled into the spoon, the compression and subsequent thread engagement are not as strong.

Finally, another variation between View A and B illustrates that the threads may be mirrored to accommodate a right- or left-handed opener 100 where View A would require a counter-clockwise rotation and View B would require a clockwise rotation to remove a cork.

Figure 6A:
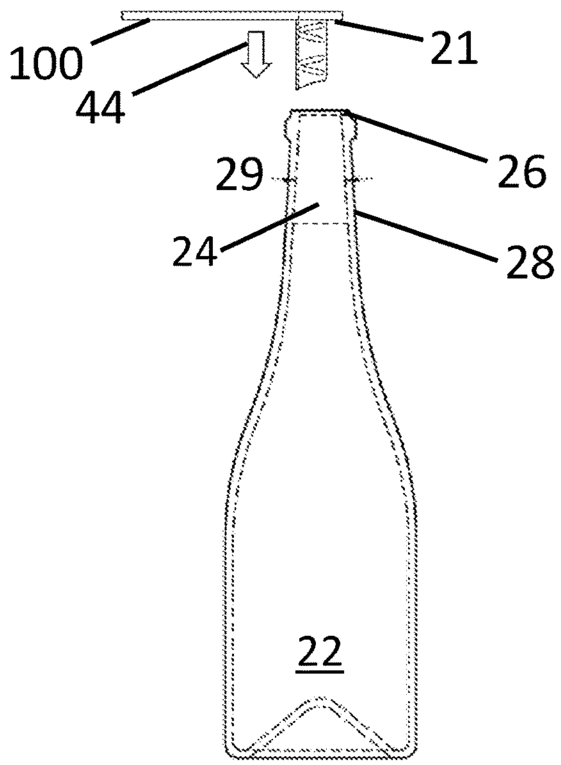
FIGS. 6*a*, 6*b*, 6*c*, and 6*d* illustrate the process of using the opener to remove a cork from a bottle.
Figure 6B:
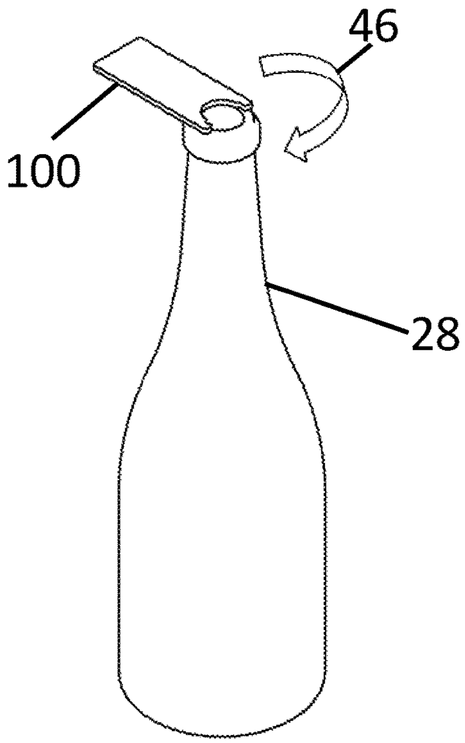
Figure 6C:
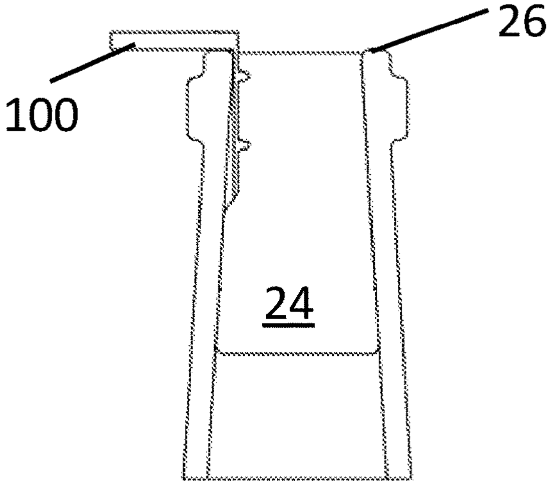

The following description along with steps illustrated in FIGS. 6*a*, 6*b*, 6*c*, and 6*d*, show how the opener 100 is intended to operate. As shown in FIG. 6*a*, a bottle 22 is initially presented with a cork 24 stopper positioned within the bottle neck 28 and flush to the bottle lip 26. Utilizing a downward force 44 the wedging edge 16 of the spoon 12 is slid between the cork 24 and the inner surface of the bottle lip 26 until the series of internal threads 14 on the inner face 42 of the spoon 12 engage the cork 24. By applying a rotational force 46 upon the handle 10, as shown in 6b, the interaction between the internal threads 14 and the cylindrical surface of the cork 24 cause the spoon 12 of the opener 100 to bore deeper into the neck of the bottle 28. The spoon 12 will continue to drive into the bottle to a depth where the shoulder 21 of the opener reaches the bottle lip 26. This position is illustrated both in a macro view of FIG. 6*b* and as a detailed cross section of FIG. 6*c*.

Figure 6D:
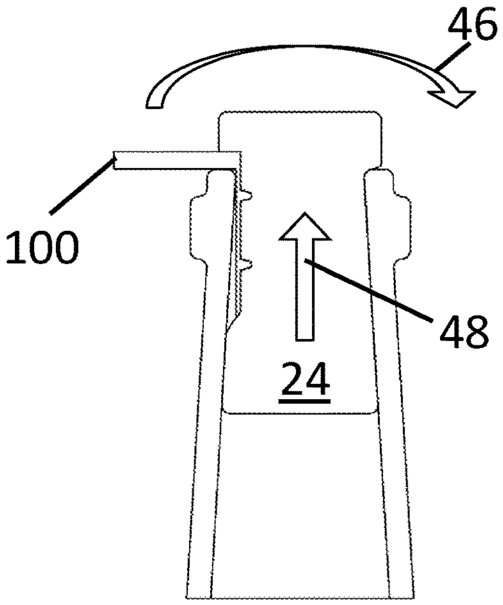

As shown in FIG. 6*d*, with the shoulders 21 resting on the bottle lip 26, any additional rotational force 46 will cause the internal threads 14 to lift 48 the cork 24 out of the bottle 22. By continuing to twist the handle, the cork 24 will rise until it disengages from the bottle and falls away from the opener 100.

Figure 7:
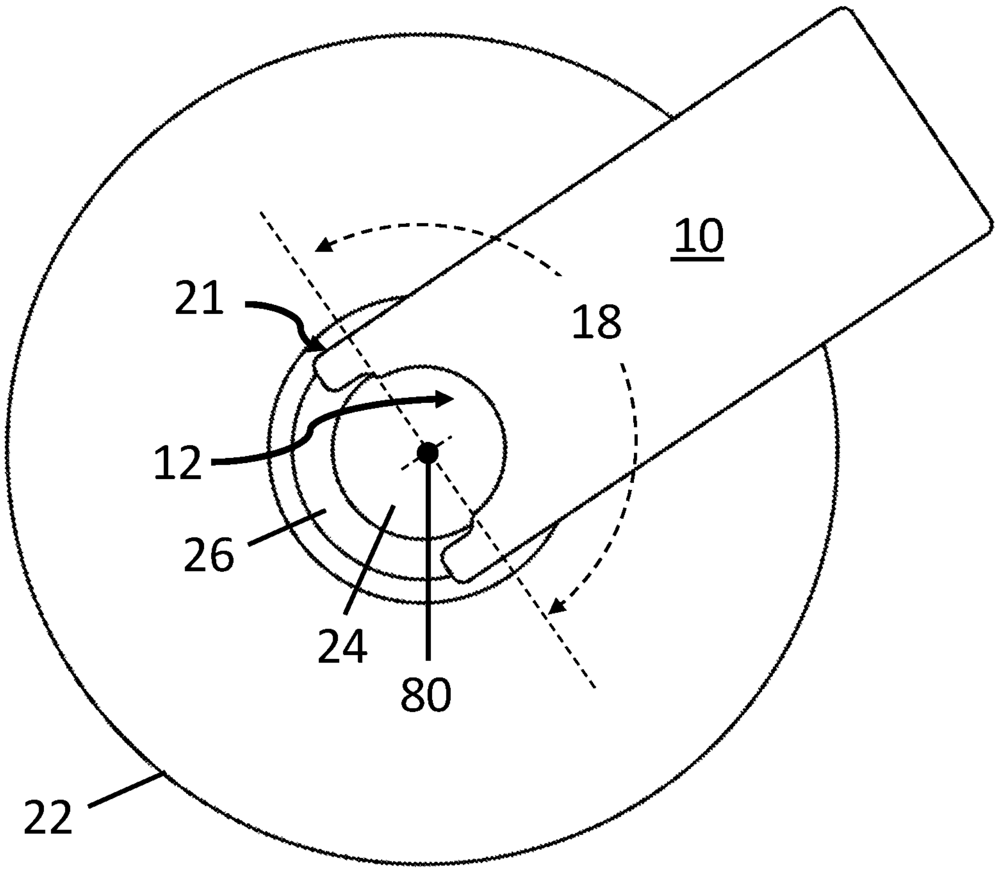
FIG. 7 is a top view of the opener engaged with a bottle.

FIG. 7 provides a top view of the process, tool alignment based on a central axis 80 or longitudinal axis of the semi-cylindrical pipe, and physical characteristics such as arc angle 18, the shoulder 21, and bottle lip 26 interface.

The opener 100 may be constructed as a single die-cast employing any number of materials (plastics, metals, etc.) Alternatively, the opener 100 may be constructed as two separate pieces. A two-piece design may allow different manufacturing techniques and non-similar materials, such as a metal spoon and plastic handle.

Figure 8A:
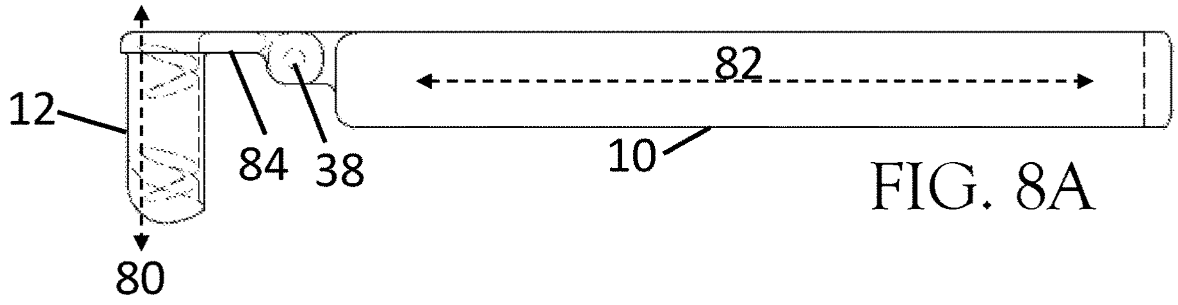
FIG. 8A and FIG. 8B show the side view of a hinged wine opener in the open and closed position.
Figure 8B:
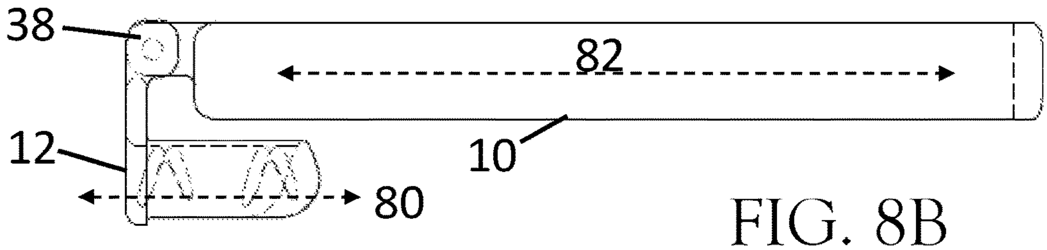

In some embodiments, a hinge 38 may be employed to make an opener that is capable of folding. FIGS. 8A and 8B provide a side view of a hinged opener 100 in the open and closed position respectively. The open position, as shown in FIG. 8A, is defined as having the central axis 80 of the semi-cylindrical pipe perpendicular or generally perpendicular to the longitudinal axis 82 of the handle 10. The closed position, as shown in FIG. 8B, is defined as having the central axis of the semi-cylindrical pipe parallel or generally parallel to the longitudinal axis of the handle.

In some embodiments the spoon may require an additional support member or spoon extension 84 to accommodate the hinge. As shown, the spoon extension serves first as a mechanical feature to create the hinge; second, as an attachment point for the spoon; and third, as the shoulder which contacts the bottle lip once the spoon is fully inserted into the bottle neck. In other embodiments, the spoon may include mechanical features such that the spoon is directly integrated into the hinge assembly.

Figure 9:
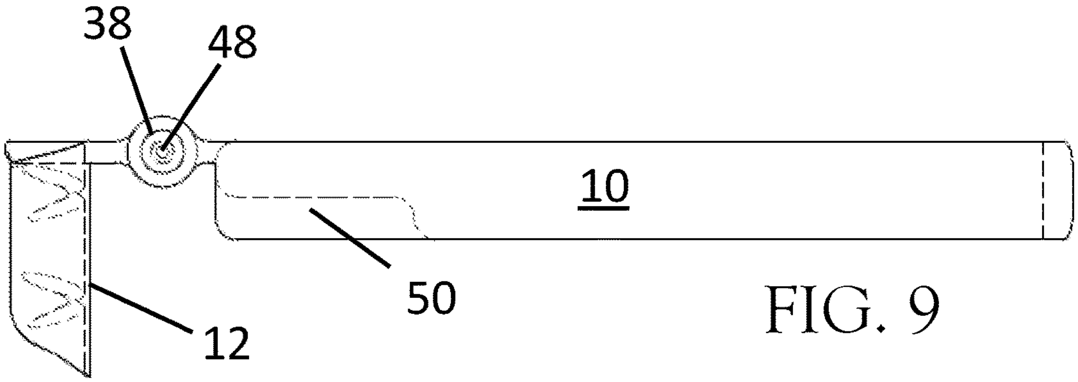
FIG. 9 shows a side view of a hinged wine opener in the open position having a spoon receiver in the handle.

FIG. 9 shows a handle 10 with a recessed cavity 50 adapted to receive a portion of the spoon when the opener is in the closed position. By receiving the spoon into the recessed cavity, both the user and the spoon are provided a degree of protection. As shown in FIG. 9, the axis of the hinge 48 is generally coplanar with the top of the handle.

Figure 10:
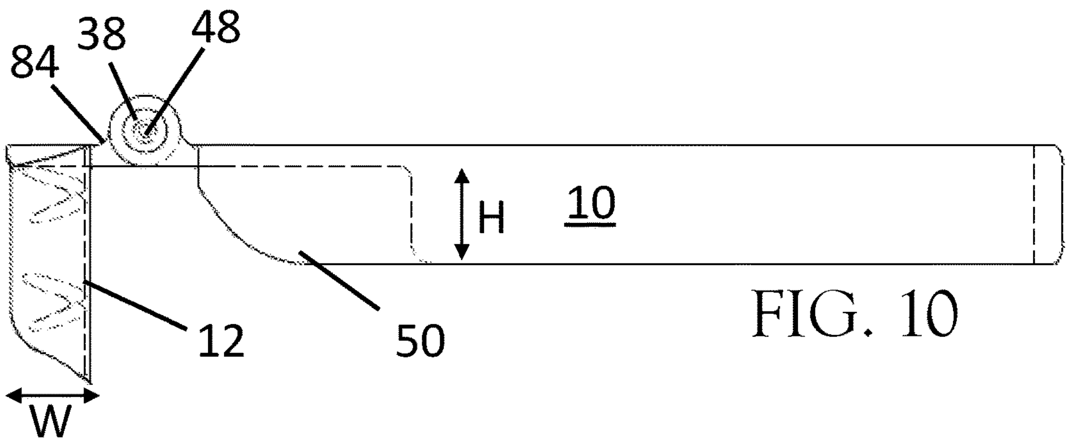
FIG. 10 shows a side view of a hinged wine opener in the open position with a raised hinge.

FIG. 10 provides additional protection as the handle is adapted to fully engulf the body of the spoon 12 into the recessed cavity 50. Several mechanical features are presented in FIG. 10 which enable the receiver to fully engulf the spoon 12. First, the height (H) of the recessed cavity must be equal or greater than the width (W) of the spoon 12. A second feature is the hinge of FIG. 10 is that the axis of the hinge 48 is raised above the plane created by the top of the handle. An additional feature which aids in positioning the spoon within the recessed cavity 50 is the shorter spoon extension 84.

Figure 11A:
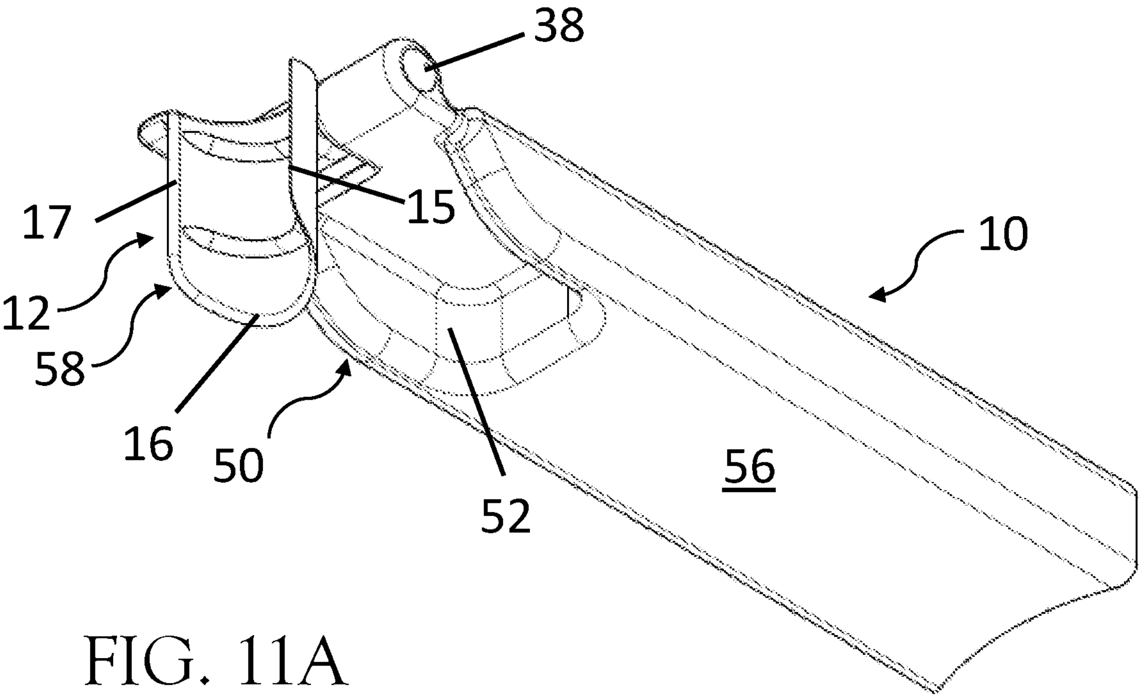
FIGS. 11A and 11B show an upward view of a hinged wine opener having a spoon receiver in the open and closed position.
Figure 11B:
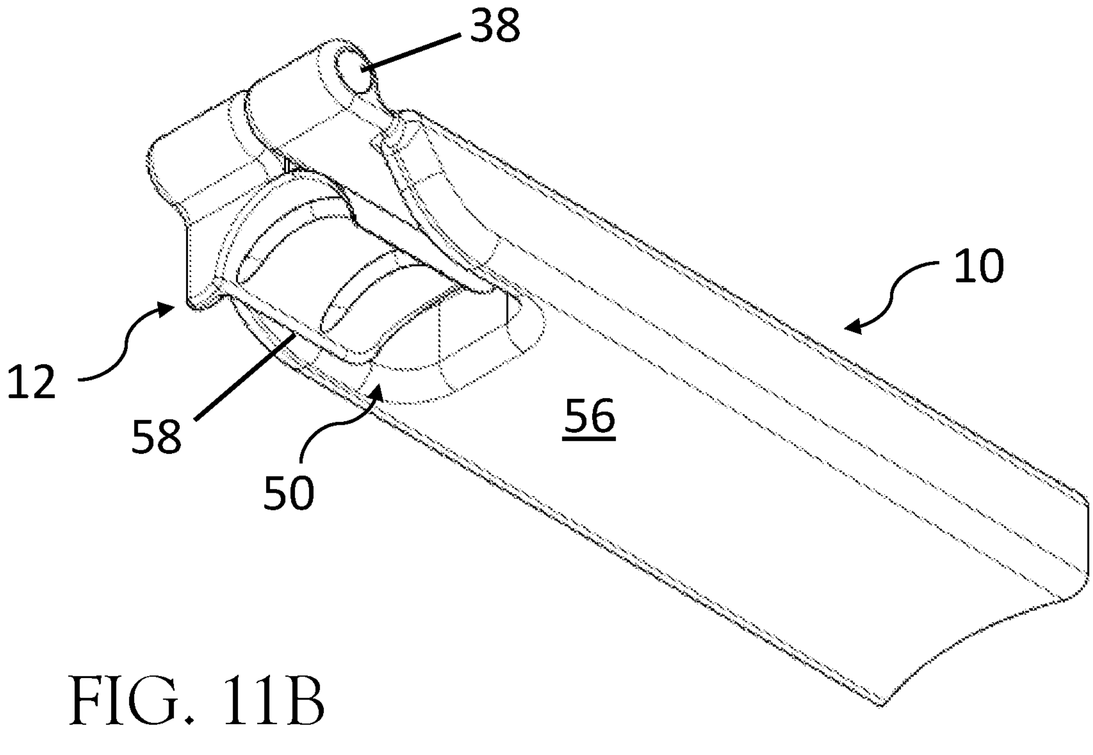
Figure 12:
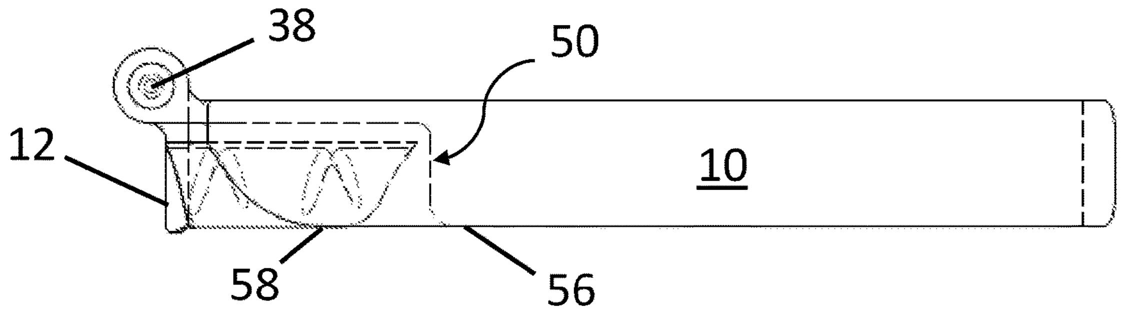
FIG. 12 shows a side view of the hinged wine open having a spoon receiver in the closed position.

FIG. 11A and FIG. 11B provide an upward isometric view of a hinged opener including a recessed cavity 50 adapted to fully receive the spoon 12. Specifically, FIG. 11A shows the hinged opener in the open position and FIG. 11B shows the hinged opener in the closed position. As shown, the recessed cavity 50 is defined and bound by three continuous cavity walls 52, which creates a boundary, and opens both to the bottom surface 56 of the handle 10 and towards the spoon 12. A spoon edge 58 is defined by and includes the contiguous surfaces including the leading edge 15, trailing edge 17, and wedging edge 16. As shown in FIG. 11B, in the closed position the spoon edge resides above the bottom surface 56 of the handle 10. To say it differently, in the closed position, the spoon 12 and the spoon edge 58 reside entirely or is engulfed within the recessed cavity 50 of the handle. The cavity walls 52, thereby provide protection on the two lateral sides (trailing edge and leading edge) of the spoon and the wedging edge of the spoon 12. A side view of the hinged opener including a recessed cavity 50 is shown as FIG. 12 to further illustrate the spoon 12 and spoon edge 58 residing entirely within the recessed cavity and above the bottom surface 56 of the handle 10.

Figure 13:
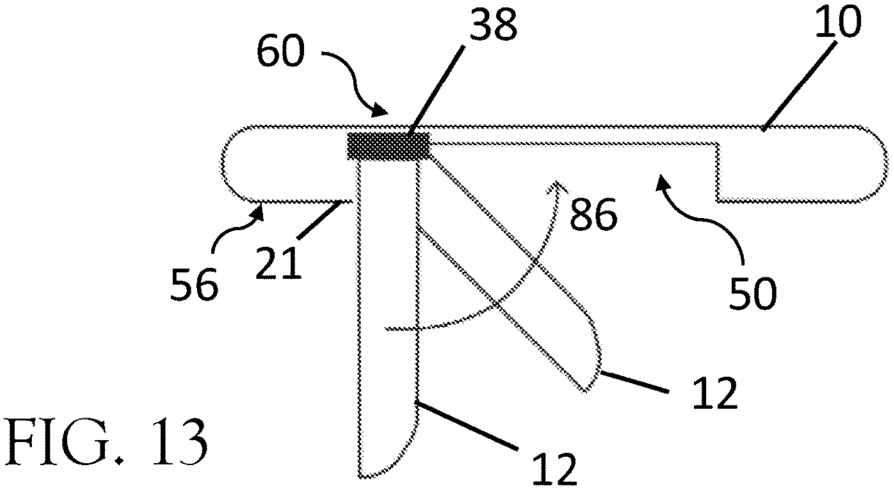
FIG. 13 shows a side view of a foldable wine opener with an intermediate hinge.
Figure 14:
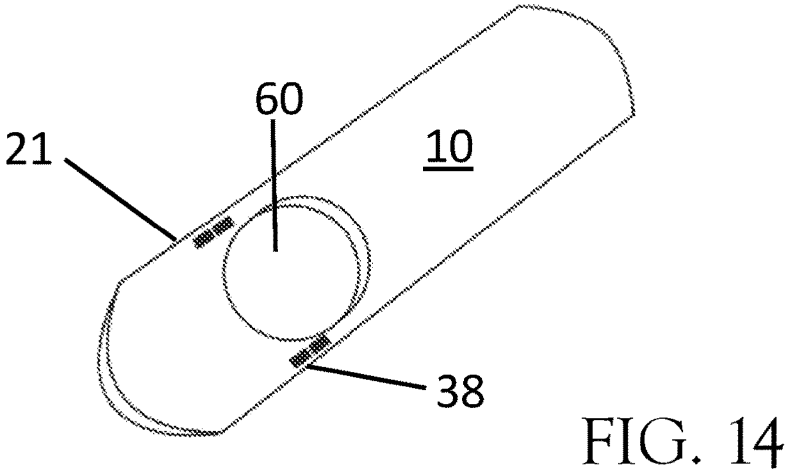
FIG. 14 shows a top view of a foldable wine opener with an intermediate hinge.

FIGS. 13 and 14 show a side view and a top view respectively of a two-piece design wherein a hinged joint 38 is configured near an opening 60, said opening is located intermediately along in the handle 10. In FIG. 13, the transition path 86 is shown as a transition from an open position towards a closed position. In the closed position, a recessed cavity 50 allows the spoon 12 to fold into the handle 10. A shoulder 21 is created by the bottom surface of the handle 56 that is surrounds the spoon 12.

FIG. 14 shows the top view of the hinged opener in the open position where the central axis of the spoon 12 is generally perpendicular with the longitudinal axis of the handle 10. An opening 60 in the handle provides the passage of a cork as it is removed from the bottle.

Figure 15:
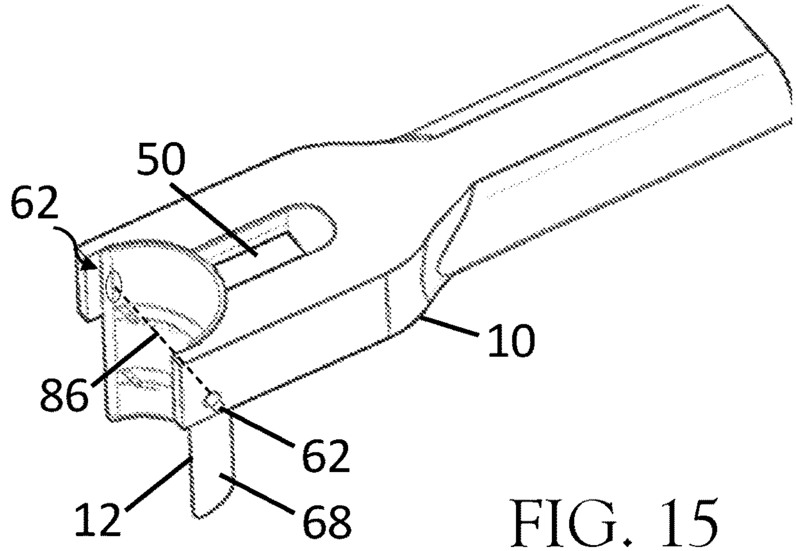
FIG. 15 shows a top isometric view of a foldable wine opener in the open position with an integrated hinge.

FIG. 15 shows a top view of a foldable wine opener with the hinge in direct communication with the body of the spoon in the open position. Two pins 62 are positioned near the distal end of the handle which create the hinge axis 86 upon which the blade 12 pivots between an open position and a closed position. The hinge axis 86 traverses across the arc angle of the semi-cylindrical pipe and terminates at points along the chord of the semi-cylindrical pipe.

The pins may be integrated into the blade such that they protrude from the back face or exterior wall 68 of the spoon and are received either by an opening or indentation with in the handle 10. Alternatively, the pins 62 may be integrated into the handle such that they protrude from within the recessed cavity 50 and are received either by an opening or indentation within the blade 12. Finally, the pins 62 may be stand-alone components such as a rivet or other rod-like fastener.

Figure 16:
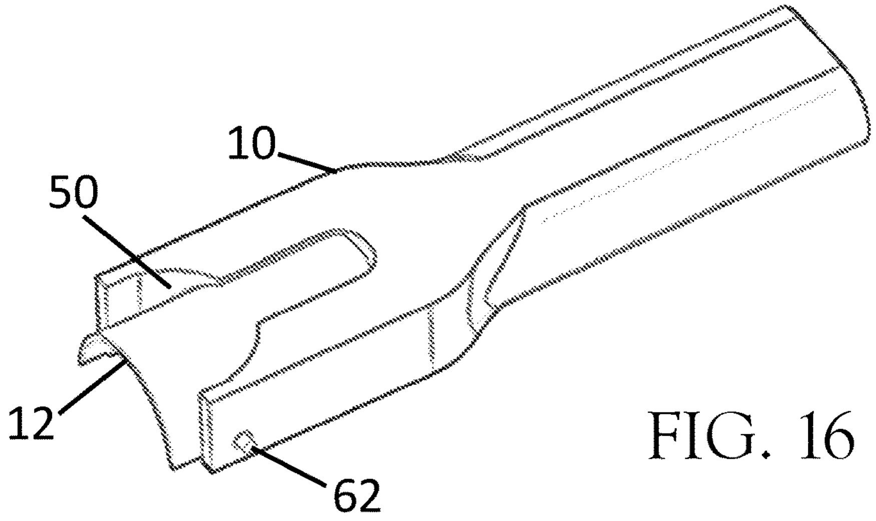
FIG. 16 shows a top isometric view of a foldable wine opener in the closed position with an integrated hinge.

FIG. 16 shows the top view of the opener with the hinge in direct communication with the body of the spoon in the closed position. As shown, the handle includes a recessed cavity 50. The recessed cavity may be configured such that the spoon 12 is fully engulfed or partially engulfed within the handle 10.

Figure 17:
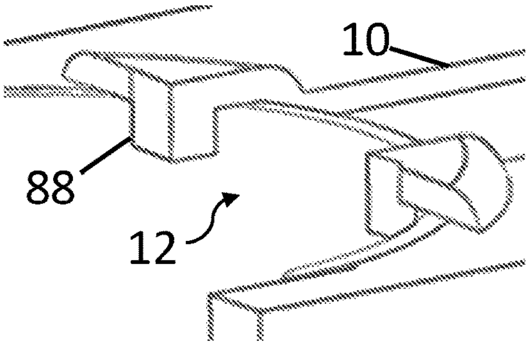
FIG. 17 shows a top isometric view of a retention mechanism to hold a hinged opener in the open position.

FIG. 17 shows a top isometric view of a retention mechanism, herein referred to as an open locking clip 88, integrated into the handle 10 of a hinged opener. The open locking clip 88 is designed to capture and secure the spoon 12 in the open position as the spoon travels from a closed position. The open locking clip has features that allows the spoon to be released in response to a given a degree of force by a user attempting to close the spoon.

Figure 18:
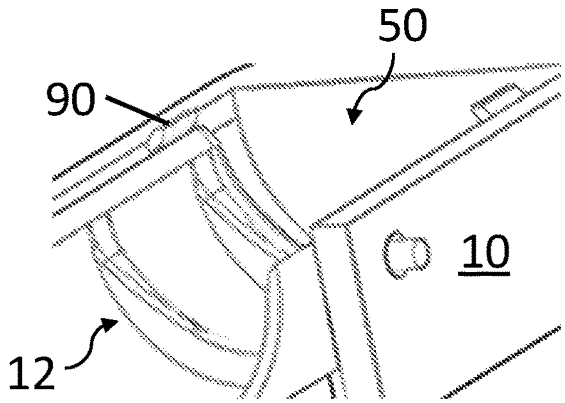
FIG. 18 shows a bottom isometric view of a retention mechanism to hold a hinged opener in the closed position.

FIG. 18 shows an upward isometric view of a retention mechanism, herein referred to as a closed locking clip 90, integrated into the handle 10 of a hinged opener. In some embodiments, the closed locking clip is positioned along the walls of the recessed cavity 50 and may be in contact with either the leading edge or trailing edge of the spoon. The closed locking clip is designed to capture and secure the spoon in the closed position as the spoon travels from an open position. The closed locking clip has features that allow the spoon to be released in response to a given degree of force by a user attempting to open the spoon.

The hinged opener may make use of various hinge configurations. Two hinge configurations are shown as examples; however, it should be understood that other variations of hinge joints may exist.

Figure 19A:
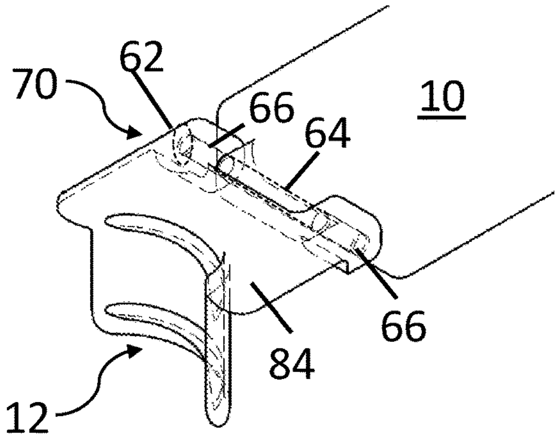
FIGS. 19A and 19B show a symmetrical hinge connecting the spoon and the handle.
Figure 19B:
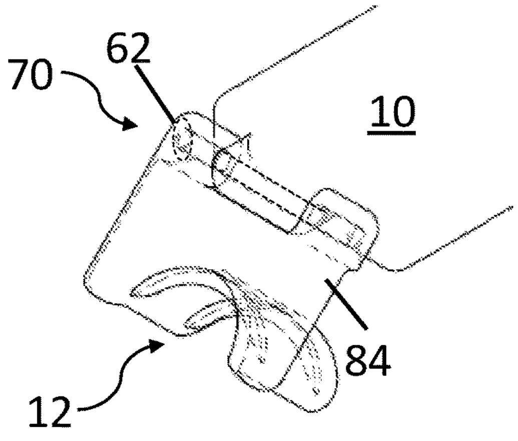

FIG. 19A and 19B show a symmetrical hinge 70 configuration which may be defined as having a knuckle extending from the handle 10 and positioned between a pair of knuckles extending from the spoon extension 84 as shown. Alternatively, the symmetrical hinge may be defined as having a knuckle extending from the spoon extension and positioned between a pair of knuckles extending from the handle 10. The hinge of FIG. 19A is shown as having a pin 62 passing through a handle knuckle 64 which extends from the handle, and a pair of spoon extension knuckles 66 which extends from the spoon extension. FIG. 19A shows the hinge in the open position. FIG. 19B shows the hinge midway through the transition between the open position and closed position.

Figure 20:
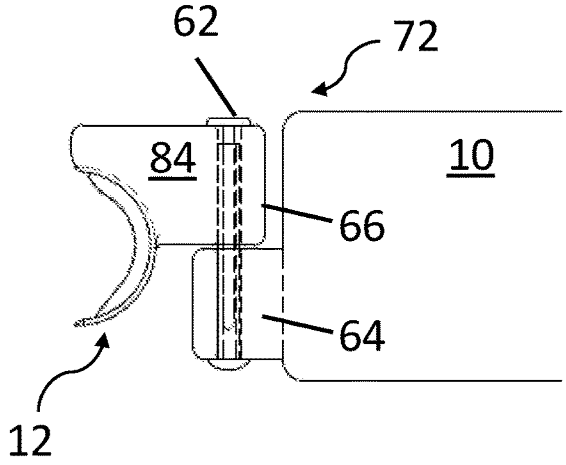
FIG. 20 shows a top view of a non-symmetrical hinge connecting the spoon and the handle.

FIG. 20 shows a top view of a non-symmetrical hinge 72 configuration in the open position. The non-symmetrical hinge is shown where there exists one handle knuckle 64 and one spoon extension knuckle 66. A pin 62 passes through both the handle knuckle and the spoon extension knuckle.

Figure 21:
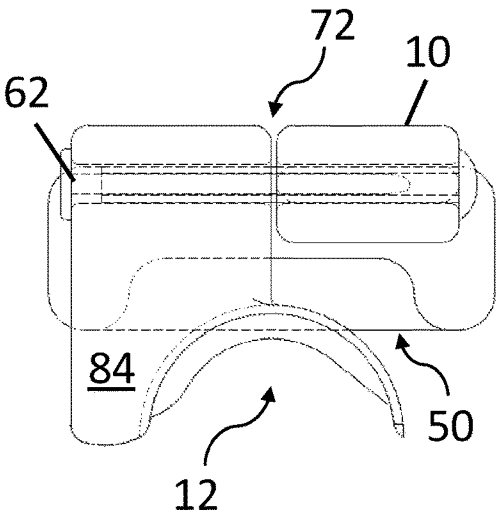
FIG. 21 shows a top view of a non-symmetrical hinge connecting the spoon and the handle.

FIG. 21 shows a front view of a non-symmetrical hinge 72 in the closed position and includes a recessed cavity 50 in which the spoon 12 is partially engulfed.

What is claimed is:

1. An opener for removing a cylindrical cork from a bottle comprising: a single semi-cylindrical pipe section and a handle, wherein an opening of said semi-cylindrical pipe section is defined by an arc angle between 65° and 190°, a central axis, and a continuous interior wall upon which at least one thread is disposed; wherein said handle includes a longitudinal axis, comprises a proximal and a distal end, and wherein said distal end of the handle is linked to the semi-cylindrical pipe section by a pair of hinged joints which enables the opener to operate between an open position and a closed position;

said open position defined as the central axis of the semi-cylindrical pipe section being generally perpendicular to the longitudinal axis of the handle and such that the opening of the semi-cylindrical pipe section is opposite the distal end of the handle, and said closed position defined as the central axis of the semi-cylindrical pipe section being generally parallel to the longitudinal axis of the handle.

2. The opener of claim 1, wherein said handle includes a recessed cavity adapted to receive the semi-cylindrical pipe section when said opener is in the closed position.

3. The opener of claim 2, wherein said handle includes a recessed cavity adapted to fully engulf the semi-cylindrical pipe section when said opener is in the closed position.

4. The opener of claim 2, wherein the recessed cavity is bound by three continuous walls.

5. The opener of claim 2, where said handle includes retention mechanisms adapted to secure the semi-cylindrical pipe in either the open position or the closed position.

6. The opener of claim 1, wherein the hinged joints are arranged in a linear fashion to form a single hinge axis.

7. The opener of claim 6, wherein the hinge axis terminates at points which form a chord of the semi-cylindrical pipe.

8. An opener for removing a cylindrical cork from a bottle comprising: a single semi-cylindrical pipe section attached to a handle, wherein said semi-cylindrical pipe section, includes an upper end, an interior wall upon which at least one thread is disposed, and an exterior wall;

wherein the handle comprises a proximal and distal end, and wherein the distal end of the handle and exterior wall of the semi-cylindrical pipe section are coupled by a hinge, said hinge enabling the opener to traverse between an open and aclosed position such that;

wherein the exterior wall of the semi-cylindrical pipe section is perpendicularly attached to the extension opposite the hinge;

and the handle includes a recessed cavity adapted to receive the semi-cylindrical pipe section when the opener is in the closed position.

9. The opener of claim 8, wherein an opening of the semi-cylindrical pipe section is defined by an arc angle between 65° and 190°.

10. The opener of claim 8 wherein said open position is defined by the handle positioned to be generally perpendicular to the longitudinal axis of the semi-cylindrical pipe and an opening of the semi-cylindrical pipe section is opposite the distal end of the handle, and said closed position is defined as the handle positioned to be generally aligned with the longitudinal axis of the semi-cylindrical pipe section.

* * * * *